(No Model.)
E. A. C. PETERSEN.
CAKE CUTTER.
No. 467,828. Patented Jan. 26, 1892.
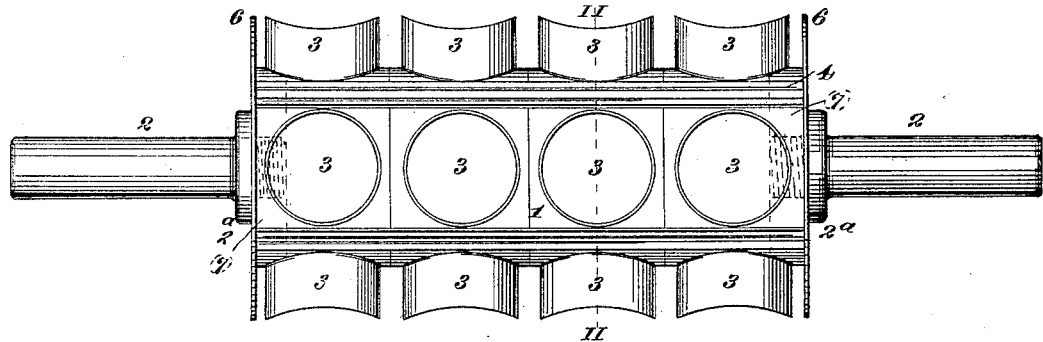
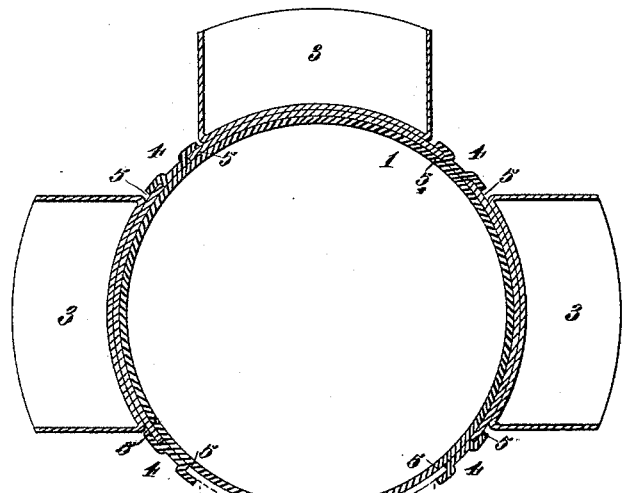

UNITED STATES PATENT OFFICE.

EDWARD A. C. PETERSEN, OF CHICAGO, ILLINOIS.

CAKE-CUTTER.

SPECIFICATION forming part of Letters Patent No. 467,828, dated January 26, 1892.

Application filed November 10, 1891. Serial No. 411,463. (No model.)

*To all whom it may concern:*

Be it known that I, EDWARD A. C. PETERSEN, of the city of Chicago, in the county of Cook and State of Illinois, have invented a certain new and useful Improvement in Cake-Cutters, of which the following is a full, clear, and exact description, reference being had to the accompanying drawings, forming part of this specification.

My invention relates to a multiple cake-cutter or device for cutting dough into cake forms; and my invention consists in features of novelty hereinafter fully described, and pointed out in the claims.

Figure I is an elevation illustrative of my invention. Fig. II is an enlarged transverse section taken on line II II, Fig. I. Fig. III is a section of one of the cutters removed.

1 represents a cylinder provided with suitable handles 2, by which it is held and turned over the sheet of dough.

3 represents a number of cutters secured to the periphery of the cylinder. These cutters may be circular, with plain cutting-edges, as shown, or they may be of any desired shape, with any fanciful kind of a cutting-edge, and they can, if desired, have a central cutter, as shown by dotted lines, Fig. III, for making doughnuts.

I prefer to removably secure the cutters to the cylinder, so that they can be removed and replaced by others of another design, and as a convenient way of attaching them to the cylinder I have shown T-plates or strips 4, made fast to the cylinder, and which are adapted to receive lips or flanges 5 on the cutters, as shown clearly in Fig. II. The cutters are held from end movement on the cylinder by disks 6, which also serve to form straight edges to the dough. I have shown one of the handles 2 screwed into its head 7 of the cylinder, and the handles are provided with flanges $2^a$, which jam the disks 6 up against the ends of the cylinder. By removing one of the handles and disks any one or more of the cutters can be removed and substituted by another.

I claim as my invention—

1. In a cake-cutter, the combination of a cylinder and a number of cutters removably secured to the cylinder, substantially as set forth.

2. In a cake-cutter, the combination of the cylinder having T-flanges on its periphery and a number of cutters held to the cylinder by said flanges, substantially as and for the purpose set forth.

3. In a cake-cutter, the combination of a cylinder, a number of removable cutters on the cylinder, the disks at the ends of the cylinder, and the handles 2, substantially as and for the purpose set forth.

EDW. A. C. PETERSEN.

In presence of—
A. M. EBERSOLE,
E. S. KNIGHT.